United States Patent

[11] 3,620,627

[72] Inventor John G. Davies
St. Paul, Minn.
[21] Appl. No. 3,117
[22] Filed Jan. 15, 1970
[45] Patented Nov. 16, 1971
[73] Assignee Buckbee-Mears Company
St. Paul, Minn.

[54] OPTICAL DENSITOMETER FOR MEASURING HOLE SIZES IN TELEVISION MASKS
10 Claims, 5 Drawing Figs.

[52] U.S. Cl. .................................................... 356/72,
250/223, 250/234, 250/236, 356/127, 356/203,
356/239, 356/244
[51] Int. Cl. ....................................................... G01n 21/00,
G01n 21/16, G01n 2/32
[50] Field of Search ......................................... 356/72,
127, 239, 240, 203, 244; 250/223 B, 234, 236

[56] References Cited
UNITED STATES PATENTS

| | | | |
|---|---|---|---|
| 2,192,580 | 3/1940 | Sachtleben .................... | 250/223 B |
| 3,023,664 | 3/1962 | Coleman et al. ............... | 356/203 X |
| 3,479,514 | 11/1969 | Kidwell ........................ | 250/223 B |
| 3,480,786 | 11/1969 | Kottman ....................... | 356/203 X |
| 3,518,013 | 6/1970 | Sanford et al. ................. | 356/203 |

*Primary Examiner*—Ronald L. Wibert
*Assistant Examiner*—Warren A. Sklar
*Attorney*—Stryker and Jacobson

ABSTRACT: Apparatus for optically measuring the hole size over the curved surface of a shadow mask wherein a light source and a detector are both mounted on a pivot arm which allows the source to pass light perpendicularly through all portions of the curved surface of the mask to the detector.

PATENTED NOV 16 1971 3,620,527

INVENTOR
JOHN G. DAVIES

BY Stryker & Jacobson

ATTORNEYS

OPTICAL DENSITOMETER FOR MEASURING HOLE SIZES IN TELEVISION MASKS

BACKGROUND OF THE INVENTION

In the manufacture of color television tubes, shadow masks are prepared with a pattern of holes which vary in size as a function of their distance from the center of the mask. The mask is used to generate the phosphor dot pattern on the face of the tube. Following this the holes are enlarged to their operating size. To facilitate this process an instrument is required which is capable of conveniently measuring both the hole sizes in the mask and the density of the phosphor dot pattern on the tube face as a function of the distance from the center of the mask or tube face. A source of light which projects light through the mask or tube face to a suitable detector would be ideal if it were not for the curved surface of the mask or tube face. This curved surface requires apparatus which can be positioned so as to direct light perpendicularly through the curved surface irrespective of which portion is being measured. My invention provides apparatus to accomplish this task.

SUMMARY OF THE INVENTION

Briefly, the shadow mask or tube face is supported at its corners on a rotatable base which is open in the center to permit light to shine therethrough. The rotatable base rests in turn on a table which also has a light-admission opening therein. A light source and a light-intensity detector are both mounted on a pivot arm which rotates about a supporting shaft mounted to the lower part of the table. The pivot arm allows the source to travel through an arc parallel to the inside surface of the mask or tube face and further allows the detector to travel through an arc parallel to the outside surface of the mask or tube face. The rotatable base allows rotation of the mask so that measurements can be made in any direction from the center of the mask or tube face. Thus, it is an object of my invention to provide measuring apparatus capable of dealing with a curved surface. Further objects and advantages will become apparent upon consideration of the following description and drawings.

DESCRIPTION OF THE PREFERRED EMBODIMENT

Figure 1A:
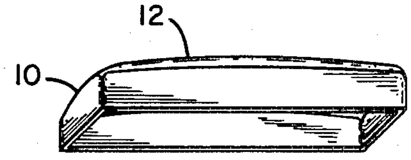
FIGS. 1*a* and 1*b* are perspective views of a typical tube face and a typical shadow mask respectively.
Figure 1B:
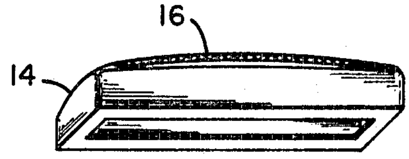

FIG. 1*a* shows a typical glass television tube face 10. The surface portion 12 is covered with a phosphor dot pattern with the interdot spaces blackened in accordance with the latest developments in tube design. Tube faces such as 10 may be tested to determine the accuracy of the pattern by passing light from a known intensity source perpendicularly through the surface 12 at various locations to a detector and measuring the amount of radiation passing through. The fraction of transmitted radiation varies as a function of the distance from the center of tube face 10. Thus, it is desirable to provide apparatus to make this perpendicular measurement over all points equally distant from the center in a convenient manner. The same testing procedure is required for a shadow mask 14 such as shown in FIG. 1*b*. Mask 14 has a foraminous portion 16 formed from a multitude of tiny apertures which, like the tube face, vary in size as a function of their distance from the center. The size of the holes may be measured with the same light source and detector as the tube face. The present invention contemplates apparatus to perform this test as shown in FIG. 2.

Figure 2:
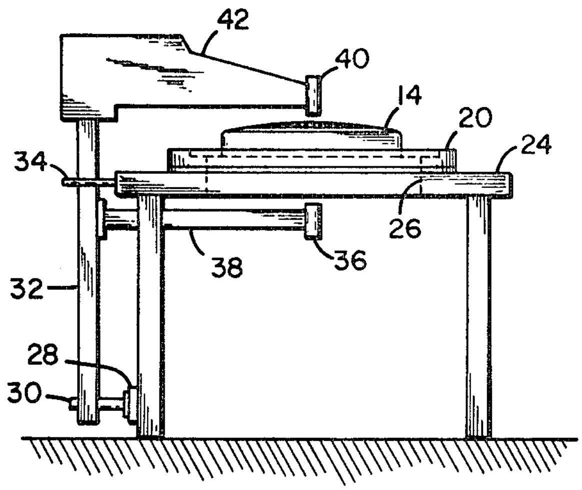
FIG. 2 is an elevational front view of a preferred embodiment of the present invention.
Figure 3:
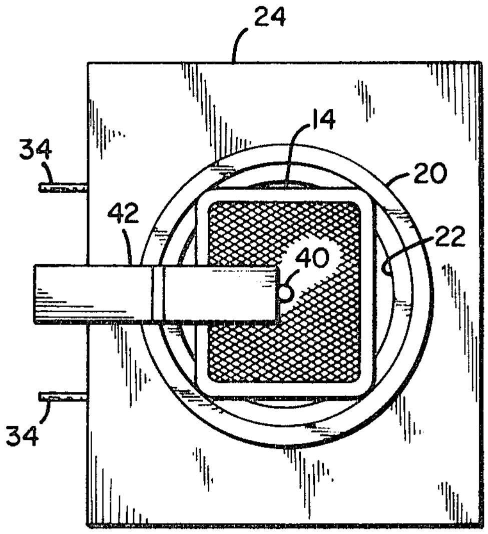
FIG. 3 is a top view of the apparatus of FIG. 2.
Figure 4:
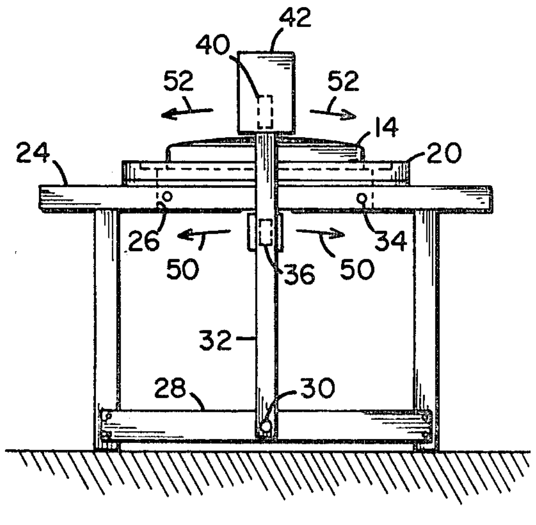
FIG. 4 is a side view of the invention as viewed from the left side in FIG. 2.

In FIG. 2 and hereinafter mask 14 is described only for simplicity although the test equipment works equally well with a tube face 10. The mask rests on a rotatable annular base 20 which has a mask-supporting rim 22. Simultaneous reference should be had to the top view of FIG. 3 and the side view of FIG. 4 for a complete understanding of the invention. Rotatable base 20 is carried by any suitable bearing although an annular ball bearing race is contemplated for the preferred embodiment. Rotatable base 20 is carried by a table 24 which has an opening 26 therein. A crossmember 28 supports a pivot shaft 30 upon which a pivot arm 32 rotates. Arm 32 may be secured in any convenient fashion, however, a pair of limit pins 34 are shown in the preferred embodiment. A light source 36 is carried at the end of a tube 38 attached to arm 32. A light detector 40 is carried by a housing 42 also attached to arm 32. Thus, both source 36 and detector 40 are fixed with respect to each other and travel through generally parallel arcs as indicated in FIG. 4 by arrows 50 and 52. The length of arm 32 is chosen to approximate the radius of curvature of mask 14 so that the light from source 36 always passes perpendicularly through mask 14 to detector 40. The surface 16 of shadow mask 14 closely approximates a portion of a sphere so that mask 14 can be rotated on rotatable base 20 to all positions and still be accurately measured. Although it is difficult to see in FIG. 4 pivot pin 30 is displaced slightly to the right of center on crossmember 28. It has been found that this modification permits the testing equipment shown to be useful in measuring a variety of sizes of shadow masks. If the pivot pin 30 were centered source 36 would always be perpendicular to one size mask having a similar radius to arm 32. A small displacement however, permits several different masks to be measured with the deviation from perpendicular remaining small enough to be of little consequence. For example, the preferred embodiments uses a displacement of about seven-eighths of an inch to the right in FIG. 4. All measurements are then conducted on the right-hand swing in FIG. 4. With this displacement the preferred embodiment conveniently measures masks ranging in size from 19 to 25 inches with an error of less than plus or minus one and a half degrees from perpendicular.

A number of modifications may be made to the disclosed apparatus without departing from the spirit and scope of the invention. For example, any type of radiation source may be used including nonvisible types. Housing 42 is shown conveniently enlarged to accommodate if desired electronic circuitry and instruments associated with the testing apparatus.

I claim:

1. Apparatus to measure perpendicular tensmissivity over the curved surface of an object comprising in combination:

rotatable support means to support the object and permit light to pass through the curved surface of the object;

base support means to support said rotatable support means;

radiation-producing means to produce a radiation beam;

radiation-measuring means positioned in said radiation beam to receive radiation from said radiation-producing means through the curved surface of the object; and pivotable support means pivoted on said base support means and operable to hold the radiation-producing means in alignment with the radiation-measuring means, one on each side of the curved surface of the object and further operable to allow arcuate movement of said radiation-producing means, and said radiation-measuring means generally contiguous to the curved surface of the object, and wherein the rotatable support means is rotatable to allow all portions of the curved surface of the object to be positioned in the radiation beam.

2. The apparatus of claim 1 in which the distance from said curved surface of the object to the pivot axis of said pivotable support means approximates the radius of curvature of said curved surface of the object.

3. The apparatus of claim 2 in which said rotatable support means comprises a substantially annular member carried by a generally annular bearing on said base support means.

4. The apparatus of claim 3 in which said pivotable support means comprises an elongated member pivoted at one end, and connected to a pair of extended members, which members carry said radiation-producing means and said radiation-measuring means.

5. The apparatus of claim 4 wherein said base support means comprises a generally level frame supported member with a light admission opening therein adapted to carry said annular member in a position in line with said light-admission opening.

6. The apparatus of claim 5 in which the end at which the elongated member pivots is its lower end and the extended members comprise two members which extend generally orthogonally from said elongated member.

7. The apparatus of claim 6 wherein said two extended members extend under said frame supported member and above said curved surface of the object so as to position the radiation-producing means and radiation-measuring means in line with said curved surface of the object and said light-admission opening.

8. The apparatus of claim 7 in which said radiation-producing means and said radiation-measuring means comprise light-producing and -measuring means respectively.

9. The apparatus of claim 8 including housing means incorporated into at least one of said extended members adapted to house associated electronic equipment.

10. The apparatus of claim 9 in which the point at which said elongated member pivots is displaced slightly away from the center of curvature of said curved surface.

* * * * *